United States Patent [19]
McPhail et al.

[11] Patent Number: 5,988,472
[45] Date of Patent: Nov. 23, 1999

[54] ACCESSORY MOUNTING DEVICE FOR A VEHICLE

[76] Inventors: Barbara A. McPhail; Donald W. McPhail, both of P.O. Box 196, Cimarron, Kans. 67835

[21] Appl. No.: 08/929,460

[22] Filed: Sep. 15, 1997

[51] Int. Cl.⁶ .............................. B60R 9/02; B60P 7/04; B60J 7/10
[52] U.S. Cl. ..................... 224/403; 224/404; 296/35.1; 296/100.02; 296/100.18; 296/163
[58] Field of Search ..................... 224/404, 403, 224/405; 296/37.6, 3, 41, 100.17, 100.18, 100.02, 35.1, 163; 410/101, 102, 104, 105, 106, 107, 108, 109, 111, 112, 113

[56] References Cited

U.S. PATENT DOCUMENTS

| | | | |
|---|---|---|---|
| 3,809,427 | 5/1974 | Bennett | 296/35.1 |
| 4,085,961 | 4/1978 | Brown . | |
| 4,249,684 | 2/1981 | Miller et al. . | |
| 4,805,859 | 2/1989 | Hudson . | |
| 4,838,602 | 6/1989 | Nett | 296/100.18 |
| 4,850,769 | 7/1989 | Matthews | 410/105 |
| 4,911,493 | 3/1990 | Muirhead . | |
| 4,969,784 | 11/1990 | Yanke | 410/104 |
| 5,052,737 | 10/1991 | Farmer, Jr. . | |
| 5,118,156 | 6/1992 | Richard . | |
| 5,169,200 | 12/1992 | Pugh . | |
| 5,368,210 | 11/1994 | Wotring . | |
| 5,393,114 | 2/1995 | Christensen | 296/3 |
| 5,605,264 | 2/1997 | Neal . | |

*Primary Examiner*—Linda J. Sholl
*Attorney, Agent, or Firm*—Flanagan & Flanagan; John R. Flanagan; John K. Flanagan

[57] ABSTRACT

A device which allows accessories to be securely mounted to a vehicle without the need for drilling holes in the vehicle, or otherwise modifying and damaging the vehicle, including an elongated member having a channel extending the length of the top of the elongated member which is shaped to slidably engage a variety of fastening members, and attached to manufacturer predrilled holes on the side railings of the bed of a pickup truck. The channel slidably engages a variety of fastening members, such as the head of a bolt or a snap fastener, so that they may be slid into position at intervals along the elongated member and used to fasten a variety of accessories to the vehicle. For example, the fastening members may be used to removably fasten a removable hardtop, a truck bed cover, and/or a toolbox to the side railings of a vehicle.

20 Claims, 3 Drawing Sheets

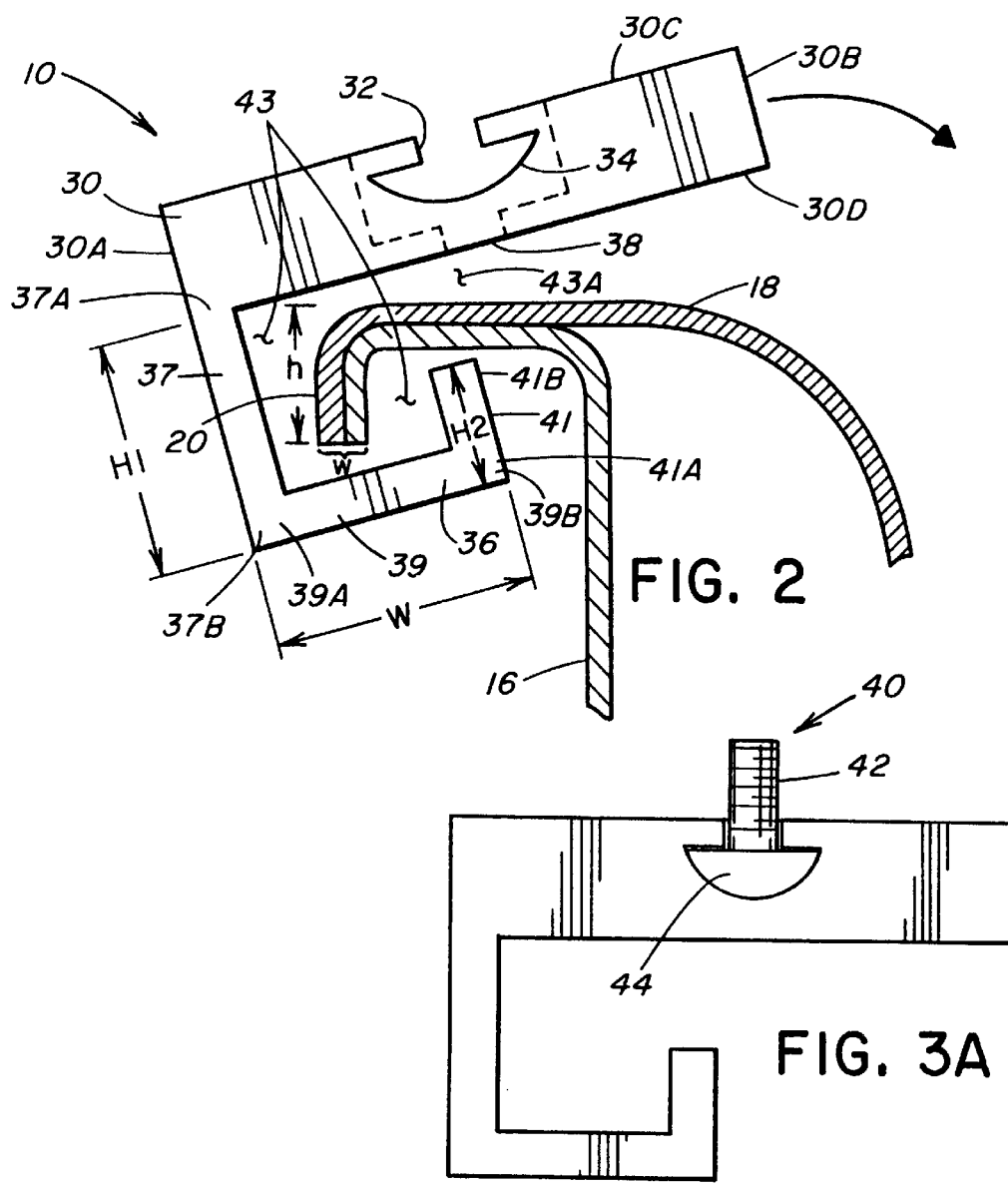
FIG. 2
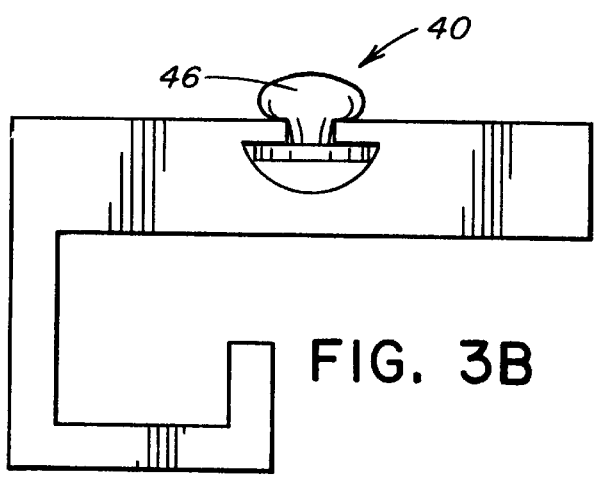
FIG. 3A
FIG. 3B

ACCESSORY MOUNTING DEVICE FOR A VEHICLE

BACKGROUND OF THE INVENTION

1. Field of the Invention

The present invention relates to mounting devices for vehicle accessories and, more specifically, to devices which allow accessories to be securely mounted to a vehicle without the need for drilling holes in the vehicle, or otherwise modifying and damaging the vehicle.

2. Description of the Related Art

Over the years many accessories have been developed for vehicles such as pickup trucks to give the owner of the vehicle versatility in the way that the owner utilizes the vehicle. For example, toolboxes or storage boxes have been designed for mounting in the bed of a pickup truck. Additionally, removable hardtops and soft covers have been developed to protect and secure cargo in the bed of a pickup truck. The accessories that have been developed require the owner to securely mount the accessory to the vehicle.

In response to such accessories, manufacturers have built pickup truck bed railings with predrilled holes for mounting the accessories. Unfortunately, due to the great variety of designs of accessories and the vastly different mounting needs of the accessories, manufacturers have been unable to manufacture a vehicle with enough predrilled holes to satisfy the needs of all the accessories on the market today. Consequently, the accessory mounting devices that have been developed require the owner to drill holes or make other modifications to the vehicle body. By modifying the vehicle body, the owner has not only made the vehicle susceptible to rust and corrosion, but also potentially lessened the resale value of the vehicle.

The following patent publications attempt to solve some of these problems; however, they all fail to achieve the same level of success as the present invention.

The following accessory mounting devices all require modification of the truck bed for mounting: U.S. Pat. No. 4,085,961, issued on Apr. 25, 1978, to Manuel D. Brown; U.S. Pat. No. 4,249,684, issued on Feb. 10, 1981, to Kenneth Miller et al.; U.S. Pat. No. 4,805,859, issued on Feb. 21, 1989, to Don Hudson; U.S. Pat. No. 4,911,493, issued on Mar. 27, 1990, to Scott A. W. Muirhead; U.S. Pat. No. 5,169,200, issued on Dec. 8, 1992, to George D. Pugh; and U.S. Pat. No. 5,605,264, issued on Feb. 25, 1997, to Gerald V. Neal.

U.S. Pat. No. 5,052,737, issued on Oct. 1, 1991, to Wilton T. Farmer, Jr. describes an attachment structure and method for securing a toolbox to a pickup truck. The purpose of the device is to provide a means to secure a toolbox within the cargo box of a pickup truck which avoids the need to drill holes in the sidewalls of the truck. However, the patent to Farmer, Jr. does not describe a versatile device capable of mounting to a vehicle a variety of accessories, such as a soft cover or a conventional removable hardtop.

U.S. Pat. No. 5,118,156, issued on Jun. 2, 1992, to Regis J. Richard describes an auxiliary load carrier for carrying a load in a support plane at or above the wheel wells in the bed of a pickup truck. Large objects are clamped to the sidewalls of the bed without necessitating permanent structural modifications of the bed of the truck. The patent to Richard describes a load carrying device having a complex mounting apparatus which is not capable of mounting to a vehicle a variety of accessories.

U.S. Pat. No. 5,368,210, issued on Nov. 29, 1994, to Randall C. Wotring describes a cargo storage apparatus that is secured by clamps to the sidewalls of a pickup truck. The patent to Wotring fails to describe a mounting device capable of securely mounting to a vehicle a variety of accessories.

None of the above inventions and patents, taken either singularly or in combination, is seen to describe the instant invention as claimed. Thus an accessory mounting device for a vehicle solving the aforementioned problems is desired.

SUMMARY OF THE INVENTION

The present invention describes a device which allows accessories to be securely mounted to a vehicle without the need for drilling holes in the vehicle, or otherwise modifying and damaging the vehicle. The invention includes an elongated member having a channel extending the length of the top of the elongated member which is shaped to slidably engage a variety of fastening members. The elongated member of the preferred embodiment is designed to be attached to manufacturer predrilled holes on the side railings of the bed of a pickup truck, although use of this invention on vehicles of every sort is contemplated. The channel is designed to slidably engage a variety of fastening members, such as the head of a bolt or a snap fastener, so that they may be slid into positioned at intervals along the elongated member and used to fasten a variety of accessories to the vehicle. For example, the fastening members may be used to removably fasten a removable hardtop, a truck bed cover, and/or a toolbox to the side railings of a vehicle.

Accordingly, it is a principal object of the invention to provide a device which allows accessories to be mounted to a vehicle without the need for drilling holes in the vehicle, or otherwise modifying and damaging the vehicle.

It is another object of the invention to provide a device which allows accessories to be quickly and securely mounted to a vehicle.

It is a further object of the invention to provide a device that may be used to removably fasten a variety of accessories to the vehicle, such as a removable hardtop, a truck bed cover, and/or a toolbox.

It is an object of the invention to provide improved elements and arrangements thereof in an accessory mounting device for a vehicle for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a front view of an accessory mounting device according to the present invention showing how the accessory mounting device is positioned on a side railing of a truck.

FIG. 3A is a front view of an accessory mounting device according to the present invention showing a bolt fastening member positioned within the channel.

FIG. 3B is a front view of an accessory mounting device according to the present invention showing a snap fastening member positioned within the channel.

Similar reference characters denote corresponding features consistently throughout the attached drawings.

DETAILED DESCRIPTION OF THE PREFERRED EMBODIMENTS

The present invention is a device 10 which allows accessories 28 to be securely mounted to a vehicle 12 without the need for drilling holes in the vehicle, or otherwise modifying and damaging the vehicle. By way of illustration and not limitation, FIGS. 1 to 5 are presented to show preferred embodiments of the invention.

Figure 1:
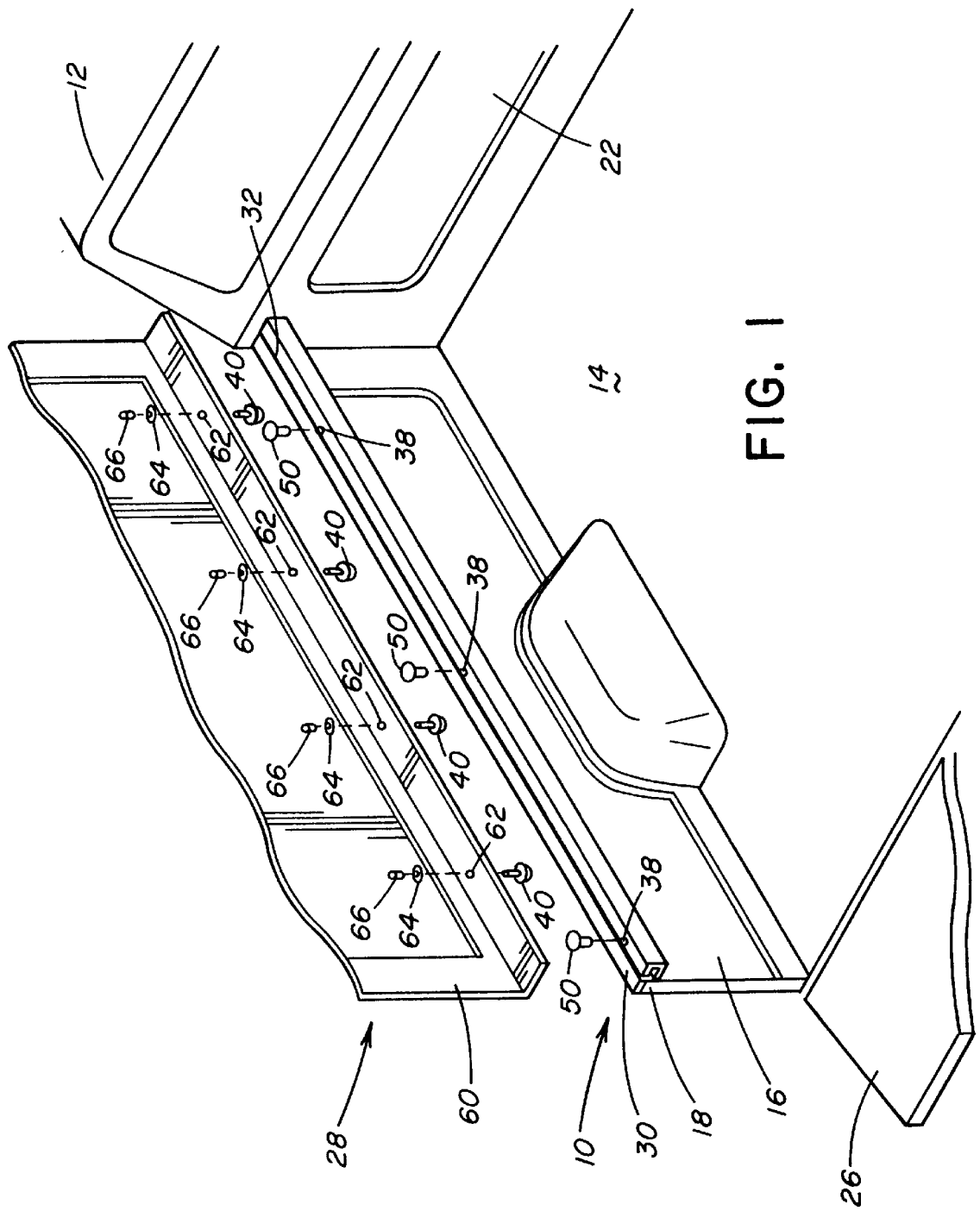
FIG. 1 is an environmental, exploded view of an accessory mounting device for a vehicle according to the present invention used with a removable hardtop.

Referring to FIG. 1, a preferred embodiment is designed to be attached to the top of the railings 18 on the upper end of sidewalls 16 of the bed 14 of a pickup truck 12. The present invention includes an elongated member 30 having a channel 32 extending the length of the top of the elongated member 30. The elongated member 30 of the preferred embodiment is designed to be attached to manufacturer predrilled holes 19 (see FIG. 4) on the railings 18 of the bed 14 of the truck 12. More particularly, the elongated member 30 includes opposite lateral side edges 30A, 30B and top and bottom sides 30C, 30D extending between the lateral side edges 30A, 30B. The channel 32 is defined in the elongated member 30 between and spaced from the opposite side edges 30A, 30B and between the top and bottom sides 30C, 30D and open along the top side 30C of the elongated member 30. The elongated member 30 is adapted for positioning above the railing 18 on the upper end of each of the sidewalls 16 of the pickup truck 12 with the bottom side 30D of the elongated member 30 resting upon the railing 18 and one of the side edges 30A of the elongated member 30 extending laterally beyond a lip 20 of the railing 18. The present invention also includes a hook member 36, as shown in FIG. 2, which extends under the lip 20 of the railing 18 to both help grasp the railing 18 and to protect the railing 18 from contact with the accessory 28. More particularly, the hook member 36 substantially encloses the lip 20 of the railing 18 when the elongated member 30 is resting upon the railing 18 on the upper end of the one sidewall 16. The hook member 36 includes a first portion 37, a second portion 39 and a third portion 41. The first portion 37 of the hook member 36 is rigidly attached at an upper end 37A to the one side edge 30A of the elongated member 30. Also, the first portion 37 has a first height H1 greater than a height "h" of the lip 20 such that the first portion 37 extends downwardly from the elongated member 30 along one side of the lip 20 to a lower end 37B disposed beyond the lip 20. The second portion 39 of the hook member 36 at an outer end 39A is rigidly attached to the lower end 37B of the first portion 37 of the hook member 36 and extends in a substantially transverse relationship to the second portion 39. Also, the second portion 39 has a width W greater than a width "w" of the lip 20 such that the second portion 39 extends toward the sidewall 16 and under and beyond the lip 20 to an inner end 39B of the second portion 39. The third portion 41 of the hook member 36 at a lower end 41A is rigidly attached to the inner end 39B of the second portion 39 of the hook member 36 and extends in a substantially transverse relationship to the second portion 39 and a substantially parallel relationship to the first portion 37. Also, the third portion 41 of the hook member 36 has a second height H2 less than the first height H1 of the first portion 37 of the hook member 36 and less than the height "h" of the lip 20 such that third portion 41 at an upper end 41B extends upwardly from the second portion 39 along an opposite side of the lip 20 to the upper end 41B which is spaced below the bottom side 30D of the elongated member 30 and also spaced below the railing 18 on the vehicle sidewall 16. As seen in FIG. 1, the hook member 36 substantially extends the length of the elongated member 30.

The elongated member 30 is positioned on the railing 18 using one of two methods. The first method involves lowering the gate 26 of the truck 12, as shown in FIG. 1, and sliding the elongated member 30 into position on the railing 18. The second and preferred method, shown in FIG. 2, involves hooking the hook member 36 under the lip 20 of the railing 18 and pivoting the elongated member 30 until the bottom side 30D of the elongated member 30 sit atop the top of the railing 18. The first and second heights H1, H2 of first and third portions 37 and 41 of the hook member 36 and the width W of the second portion 39 the hook member 36 are such relative to the height and width of the lip 20 that together the hook member 36 and elongated member 30 form an elongated cavity 43 between the hook member 36 and the bottom side 30D of the elongated member 30 having an opening 43A defined between the upper end 41B of the third portion 41 of the hook member 36 and the bottom side 30D of the elongated member 30 which provides sufficient clearance with respect to the lip 20 so as to allow the entry of the lip 20 through the opening 43A and into the elongated cavity 43 as the elongated member 30 and hook member 36 therewith are pivotally moved about and relative to the railing 18 and lip 20 of the respective sidewall 16 to position the elongated member 30 on the railing 18. The second method is preferred due to the fact that it is likely to result in little, if any, scratching of the paint, while the first method if done carelessly could result in some scratching of the paint on the railing 18.

Figure 4:
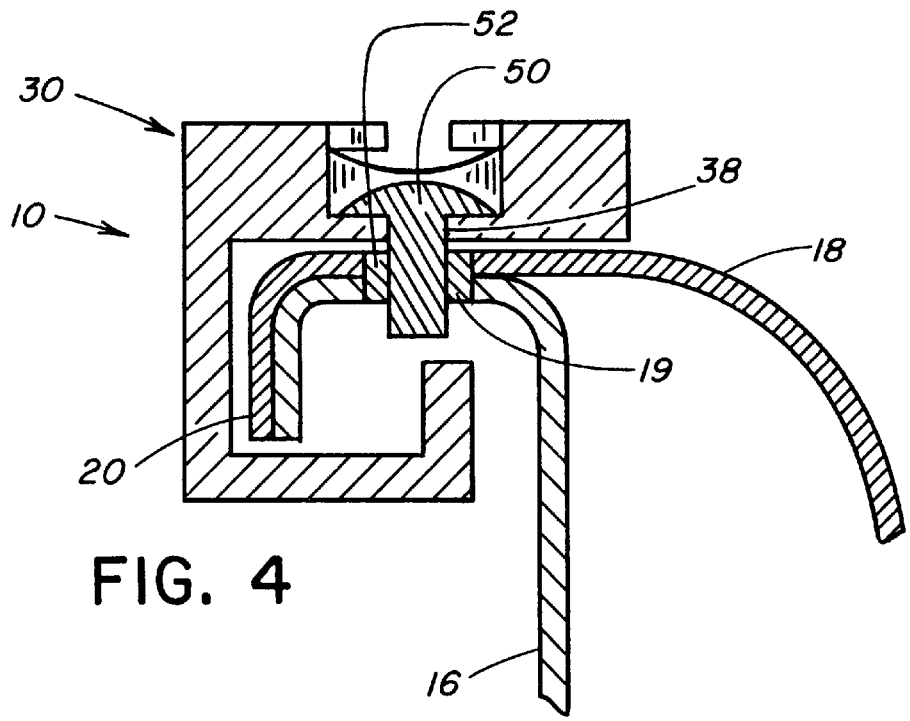
FIG. 4 is a cross-sectional view of an accessory mounting device according to the present invention positioned on a side railing of a truck and showing a means for mounting the invention to the side railing.
Figure 5:
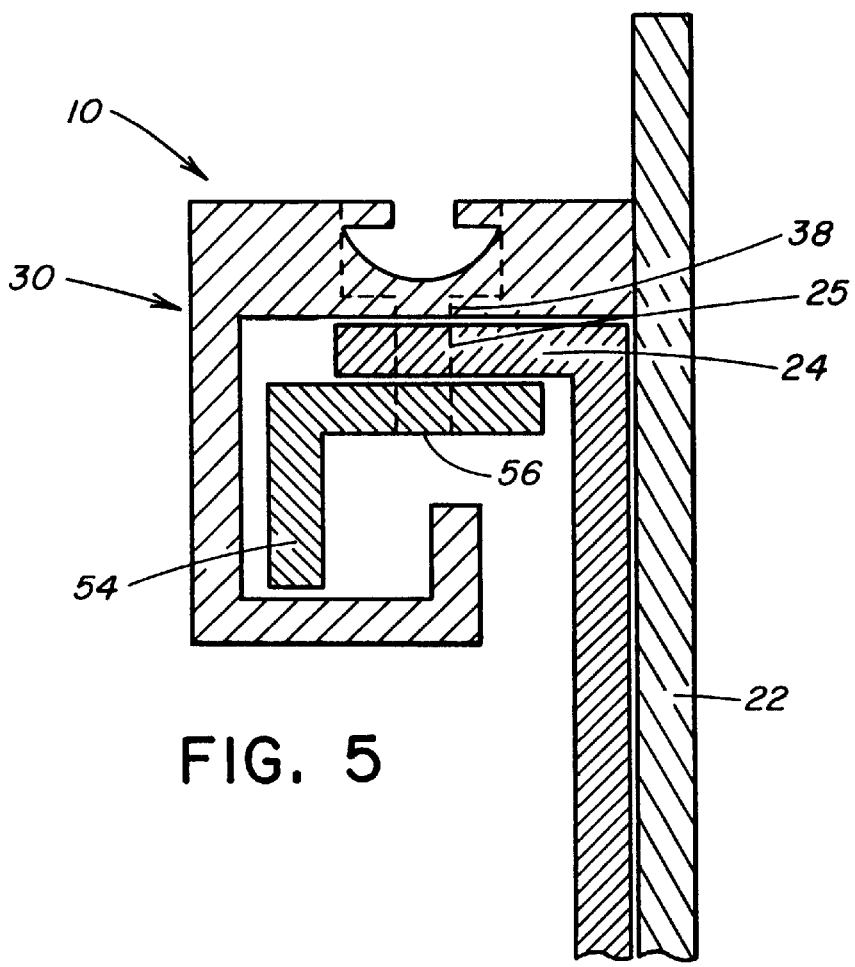
FIG. 5 is a cross-sectional view of an accessory mounting device according to the present invention mounted to the front wall on the truck bed which is adjacent the cab of the truck and showing a means for mounting thereon.

The elongated member 30 is then secured to the railing 18 by aligning the holes 38 in the elongated member 30, as shown in FIG. 4, with the predrilled holes 19 in the railing 18 and inserting a bolt 50 therethrough. The bolt 50 is preferably held in position within the predrilled holes 19 by an expandable neoprene plug 52 positioned with the predrilled holes 19. When the bolt 50 is placed within the plug 52, the plug 52 expands thereby securing the bolt 50 within the hole 19. Alternatively or additionally, the installer may wish to secure the bolt 50 using a nut (not shown). Preferably, holes 38 are bored and recessed such that the head of bolt 50 does not interfere with the fastening members 40 as they are slid along the channel 32, as best seen in FIG. 4.

The channel 32 has a profile 34 that slidably engages a variety of fastening members 40, as best seen in FIGS. 2, 3A, and 3B. The channel 32 in the preferred embodiment is designed to slidably engage a variety of fastening members 40, such as the head 44 of a bolt 42, as shown in FIG. 3A, or a snap fastener 46 (similar to those conventionally used to secure soft truck-bed covers), as shown in FIG. 3B. The fastening members 40 may be slid into position at desired intervals along the elongated member 30 and used to fasten a variety of accessories 28 to the vehicle. It should be noted that the profile 34 (see FIG. 2) of the channel 32 may be manufactured to be rectangular in cross-sectional shape to fit a fastening member 40 having the shape of a hex-head bolt. The channel 32 would then act as a wrench and prevent the hex-head bolt from rotating as a nut 66 is secured to the threaded end of the bolt.

The fastening members may be used to removably fasten a removable hardtop 60 or "topper" (see FIG. 1), a truck bed cover (not shown), and/or a toolbox (not shown) to the railings 18 of a vehicle or other similar accessories. The snap fasteners 46 are particularly well suited for mounting a soft truck-bed cover. FIG. 1 shows the present invention 10 being used to secure a removable hardtop 60 to a pickup truck 12. A method for easily installing the removable hardtop includes mounting the elongated member 30 to the truck 12 as discussed above, positioning the fastening bolt members 40 along the channel 32 to approximately align with holes 62 on the removable hardtop 60, and placing two blocks of wood (not shown) on top of each elongated member 30. The blocks of wood will help the installer align the fastening members 40 with the holes 62 in the removable hardtop 60. Once the holes 62 are aligned with the fastening members 40 on one side of the truck 12, then the blocks of wood may be removed and the washers 64 and nuts 66 may be tightened on to the fastening members 40.

Most pickup trucks today have truck beds 14 with forward walls 22 adjacent to the cab of the truck which are designed only with a ledge 24 (best seen in FIG. 5) extending therefrom, rather than a lip as extends from the side railings 18. These ledges 24 generally have predrilled holes 25. In order to aid in the attachment of an elongated member 30 to the ledge 24, a piece of angle iron 54 having holes 56 drilled therethrough can be attached to the ledge 24 using bolt 50 and a nut so as to provide an elongated structure which is substantially the equivalent of the lip 20 of the railing 18 with respect to the manner in which it functions with the elongated member 30 and hook member 36 of the device 10 of the present invention. Holes 38, 25, and 56 must be aligned and then bolt 50 is threaded through holes and held in place by a nut or other fastening device. The elongated member 30 attached to the ledge 24 on the forward wall 22 may then be used to aid in the mounting of accessories such as a removable hardtop or a soft truck-bed cover.

The elongated member 30 is preferably manufactured from extruded, lightweight aluminum. It may be desirable to place a cushion in between the elongated member 30 and the railing 18 in order to prevent any damage to the finish of the paint on the railing 18 of the truck 12.

It should be noted that the present invention can be used for a variety of applications other than for pickup truck bed accessories. For example, the present invention can be used for marine vehicle applications. The present invention may be sold in a kit form which includes several elongated members 30, a plurality of fastening members 40 (possibly including both bolts 42 and snap fasteners 46) and corresponding washers 64 and nuts 66, a plurality of bolts 50, a plurality of neoprene plugs 52, and a piece of angle iron 54.

The design of the present invention inherently includes a security feature that can prevent thieves from stealing certain accessories and from stealing cargo protected by the accessories. For example, a pickup truck toolbox (not shown) may be attached to the elongated member 30 using fastening members 40 which are placed through the pre-drilled holes in the toolbox and held in place by a nut. Many of these toolboxes are designed such that the fastening member 40 and nut may be attached to the inside compartment of the toolbox. Once the toolbox is closed and locked, a thief will not have access to the fastening member and nut without breaching the lock on the toolbox. The same can be said for the removable hardtop.

It is to be understood that the present invention is not limited to the embodiments described above, but encompasses any and all embodiments within the scope of the following claims.

We claim:

1. An accessory mounting device for a vehicle having a sidewall with predrilled mounting holes in an end thereof, said accessory mounting device comprising:

(a) an elongated member adapted for positioning on the end of the vehicle sidewall, said elongated member including opposite lateral side edges, top and bottom sides extending between said lateral side edges, and a channel defined in said elongated member between and spaced from said opposite side edges and between said top and bottom sides and being open along said top side, said bottom side of said elongated member resting upon the end of the vehicle sidewall and one of said side edges of elongated member extending beyond a lip extending laterally from the end of the vehicle sidewall;

(b) a hook member extending substantially the length of the elongated member and substantially enclosing the lip of the end of the vehicle sidewall when the elongated member is resting upon the end of the vehicle sidewall, said hook member including (i) a first portion rigidly attached at an upper end to said one of said side edges of said elongated member and having a first height greater than a height of the lip of the vehicle sidewall such that said first portion extends downwardly from said elongated member along one side of the lip to a lower end of said first portion disposed beyond the lip, (ii) a second portion rigidly attached an one end to said lower end of said first portion of said hook member and having a width greater than a width of the lip of the vehicle sidewall such that said second portion extends from said first portion toward the vehicle sidewall under the lip to an opposite end of said second portion disposed between the lip and the vehicle sidewall, and (iii) a third portion rigidly attached at a lower end to said opposite end of said second portion of said hook member and having a second height less than said first height of said first portion of said hook member and less than the height of the lip of the vehicle sidewall such that said third portion extends upwardly from said opposite end of said second portion along an opposite side of the lip to an upper end disposed below said elongated member and the end of the vehicle sidewall, said first and second heights of said first and third portions of said hook member and said width of said second portion of said hook member being dimensioned relative to the height and width of the lip of the vehicle sidewall such that together said hook member and elongated member form an elongated cavity between said hook member and said bottom side of said elongated member having an opening defined between said upper end of said third portion of said hook member and said bottom side of said elongated member which provides sufficient clearance with respect to the lip to allow entry of the lip through said opening and into said elongated cavity as said elongated member and hook member therewith are pivotally moved about and relative to the end and lip of the vehicle sidewall to position said elongated member on the end of the sidewall;

(c) means for mounting said elongated member to the end of the vehicle sidewall using the predrilled mounting holes therein; and (d) at least one fastening member having a first portion received within said channel and slidably adjustable along said channel and a second portion attached to said first portion and extending from said channel beyond said top side of said elongated member for attaching said second portion of said fastening member to an accessory.

2. The accessory mounting device for a vehicle as defined in claim 1, wherein said channel extends the length thereof.

3. The accessory mounting device for a vehicle as defined in claim 1, wherein:
said second portion of said hook member extends substantially transverse to said first portion of said hook member;
said third portion of said hook member extends substantially transverse to said second portion of said hook member; and
said elongated cavity extends substantially the length of said elongated member.

4. The accessory mounting device for a vehicle as defined in claim 1, wherein said means for mounting said elongated member to the vehicle using the predrilled mounting hole comprises:
a plug having a hole, said plug being positioned within the predrilled mounting hole; and
a bolt positioned within said hole of said plug whereby said plug is deformed outward against the predrilled mounting hole on the vehicle.

5. The accessory mounting device for a vehicle as defined in claim 4, wherein said plug is made of neoprene.

6. The accessory mounting device for a vehicle as defined in claim 1, wherein said fastening member is a bolt.

7. The accessory mounting device for a vehicle as defined in claim 6, wherein said bolt has a head portion and a threaded shaft portion, said head portion being said first portion and said threaded shaft portion being said second portion.

8. The accessory mounting device for a vehicle as defined in claim 7, further comprising means for attaching said second portion of said fastening member to an accessory, said attaching means being a nut having a threaded hole.

9. The accessory mounting device for a vehicle as defined in claim 1, wherein said fastening member is a snap fastener.

10. The accessory mounting device for a vehicle as defined in claim 1, wherein said elongated member is made of aluminum.

11. A kit for an accessory mounting device for a vehicle having a sidewall with predrilled mounting holes in an end thereof, said kit comprising:
a) a first elongated member adapted for positioning on the end of the vehicle sidewall, said elongated member including opposite lateral side edges, top and bottom sides extending between said lateral side edges, and a channel defined in said elongated member between and spaced from said opposite side edges and between said top and bottom sides and being open along said top side, said bottom side of said elongated member resting upon the end of the vehicle sidewall and one of said side edges of elongated member extending beyond a lip extending laterally from the end of the vehicle sidewall;
(b) a hook member extending substantially the length of the elongated member and substantially enclosing the lip of the end of the vehicle sidewall when the elongated member is resting upon the end of the vehicle sidewall, said hook member including
(i) a first portion rigidly attached at an upper end to said one of said side edges of said elongated member and having a first height greater than a height of the lip of the vehicle sidewall such that said first portion extends downwardly from said elongated member along one side of the lip to a lower end of said first portion disposed beyond the lip,
(ii) a second portion rigidly attached an one end to said lower end of said first portion of said hook member and having a width greater than a width of the lip of the vehicle sidewall such that said second portion extends from said first portion toward the vehicle sidewall under the lip to an opposite end of said second portion disposed between the lip and the vehicle sidewall, and
(iii) a third portion rigidly attached at a lower end to said opposite end of said second portion of said hook member and having a second height less than said first height of said first portion of said hook member and less than the height of the lip of the vehicle sidewall such that said third portion extends upwardly from said opposite end of said second portion along an opposite side of the lip to an upper end disposed below said elongated member and the end of the vehicle sidewall, said first and second heights of said first and third portions of said hook member and said width of said second portion of said hook member being dimensioned relative to the height and width of the lip of the vehicle sidewall such that together said hook member and elongated member form an elongated cavity between said hook member and said bottom side of said elongated member having an opening defined between said upper end of said third portion of said hook member and said bottom side of said elongated member which provides sufficient clearance with respect to the lip to allow entry of the lip through said opening and into said elongated cavity as said elongated member and hook member therewith are pivotally moved about and relative to the end and lip of the vehicle sidewall to position said elongated member on the end of the sidewall;

(c) a plurality of bolts being dimensioned and configured for mounting said elongated member to the end of the vehicle sidewall using the predrilled mounting holes therein; and (d) at least one fastening member having a first portion dimensioned and configured to be received within said channel and slidably adjustable along said channel and a second portion attached to said first portion and extending from said channel beyond said top side of said elongated member for attaching said second portion of said fastening member to an accessory.

12. The kit for an accessory mounting device for a vehicle as defined in claim 11, further comprising a second elongated member having a first planar, elongated piece perpendicularly attached to a second planar, elongated piece, said first planar, elongated piece having a second hole therethrough.

13. The kit for an accessory mounting device for a vehicle as defined in claim 11, wherein said channel extends the length thereof.

14. The kit for an accessory mounting device for a vehicle as defined in claim 11, wherein:
said second portion of said hook member extends substantially transverse to said first portion of said hook member;
said third portion of said hook member extends substantially transverse to said second portion of said hook member; and said elongated cavity extends substantially the length of said elongated member.

15. The kit for an accessory mounting device for a vehicle as defined in claim 11, further comprising a plug made of neoprene and having a first hole, said plug being dimensioned and configured to be positioned within one of the predrilled mounting holes, said bolts being dimensioned and configured such that said plug is deformed outward against the predrilled mounting hole on the vehicle when one of said bolts is positioned within said first hole.

16. The kit for an accessory mounting device for a vehicle as defined in claim 11, wherein said fastening member is a second bolt.

17. The kit for an accessory mounting device for a vehicle as defined in claim 16, wherein said second bolt has a head portion and a threaded shaft portion, said head portion being said first portion and said threaded shaft portion being said second portion.

18. The kit for an accessory mounting device for a vehicle as defined in claim 17, further comprising means for attaching said second portion of said fastening member to an accessory, said attaching means being a nut having a threaded hole.

19. The kit for an accessory mounting device for a vehicle as defined in claim 11, wherein said fastening member is a snap fastener.

20. The kit for an accessory mounting device for a vehicle as defined in claim 11, wherein said first elongated member is made of aluminum.

* * * * *